C. Perley,
Hose Coupling.
N° 37,767. Patented Feb. 24, 1863.
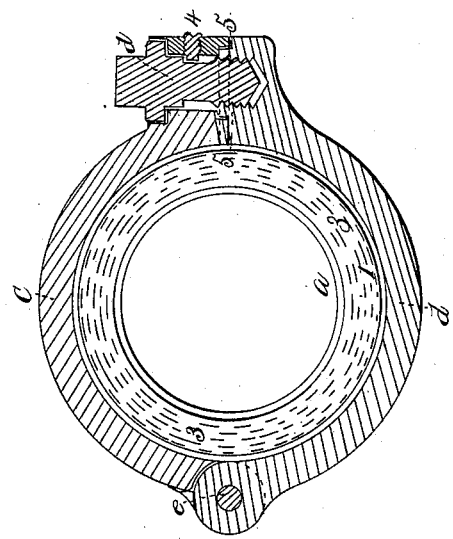
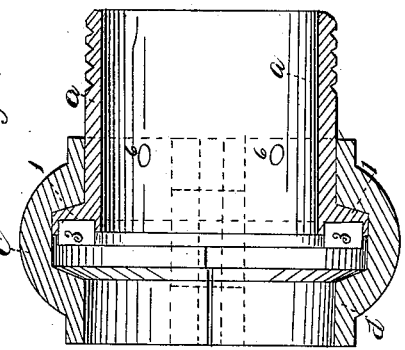
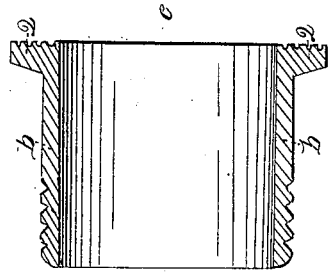
Witnesses:
Lemuel W. Serrell.
Thos. Geo. Harold.
Inventor:
Charles Perley.

UNITED STATES PATENT OFFICE.

CHARLES PERLEY, OF NEW YORK, N. Y.

IMPROVEMENT IN HOSE-COUPLINGS.

Specification forming part of Letters Patent No. 37,767, dated February 24, 1863.

*To all whom it may concern:*

Be it known that I, CHARLES PERLEY, of the city and State of New York, have invented, made, and applied to use a certain new and useful Improvement in Couplings for Hose; and I do hereby declare that the following is a full, clear, and exact description of my said invention, reference being had to the annexed drawings, making part of this specification, wherein—

Figure 1 is a section of the coupling-clasp and one of the pipes to be coupled. Fig. 2 is a detached section of the other pipe to be coupled, and Fig. 3 is a cross-section of the coupling-clasp.

Similar marks of reference denote the same parts.

My invention is intended especially for coupling the lengths of fire-hose to each other or to a hydrant; and it consists in the employment of a hinged clasp to force and compress (upon each other or an intervening washer) the inclined flanges at the respective ends of the pipes to be coupled, said hinged clasp being brought together by a screw in a peculiar manner.

In the drawings, $a$ is the ferrule or end of the pipe to be coupled, having a flange, 1, formed inclined or thinner at the outer edge, and in an annular recess in this flange is the washer 3, of leather or other suitable material. $b$ is the pipe to be coupled, having the flange 2, similar to the flange 1. $c$ and $d$ are the parts of my clasp, hinged together at $e$, and provided with an annular groove with inclined sides around inside the said clasp. This groove is adapted to receive the flanges 1 and 2, and by the inclined parts coming in contact the flanges 1 and 2 are caused to press tightly against each other when the clasp is shut up and pressed together. I secure the said clasp together by the screw $f$, passing through an ear on the part $c$ and entering an ear on the part $d$. The screw $f$ is kept from falling out by the screw 4, the point of which takes a groove around the body of the screw, and a ring, 5, on $d$, entering a corresponding recess in $c$, around the screw $f$, takes any lateral strain on the clasp off the said screw $f$. The said screw $f$ may be turned by a wrench or key applied to its square head.

The clasp $c$ $d$ may be attached to one of the pipes $a$ $b$ by rivets, as at 6 6, Fig. 1, if desired, to prevent said clasp being disconnected or lost.

I do not claim conical flanges secured to each other by a sectional ring screwed together; but

What I claim, and desire to secure by Letters Patent, is—

A hose-coupling having the hinged clasp $c$ $d$ fitted with the screw $f$, and receiving the flanges 1 2, in the manner and for the purposes set forth.

In witness whereof I have hereunto set my signature this 26th day of December, 1861.

CHARLES PERLEY.

Witnesses:
LEMUEL W. SERRELL,
THOS. GEO. HAROLD.